US012574297B2

(12) United States Patent
Basu et al.

(10) Patent No.: US 12,574,297 B2
(45) Date of Patent: Mar. 10, 2026

(54) SYSTEMS AND METHODS BUDGET-CONSTRAINED SENSOR NETWORK DESIGN FOR DISTRIBUTION NETWORKS

(71) Applicants: Kaustav Basu, San Jose, CA (US); Arunabha Sen, Phoenix, AZ (US)

(72) Inventors: Kaustav Basu, San Jose, CA (US); Arunabha Sen, Phoenix, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 92 days.

(21) Appl. No.: 18/627,871

(22) Filed: Apr. 5, 2024

(65) Prior Publication Data

US 2024/0340224 A1     Oct. 10, 2024

Related U.S. Application Data

(60) Provisional application No. 63/457,283, filed on Apr. 5, 2023.

(51) Int. Cl.
| | |
|---|---|
| *H04L 41/14* | (2022.01) |
| *G01S 3/80* | (2006.01) |
| *G06F 17/50* | (2006.01) |
| *H04L 67/12* | (2022.01) |

(52) U.S. Cl.
CPC ............ *H04L 41/145* (2013.01); *H04L 67/12* (2013.01)

(58) Field of Classification Search
CPC ....... H04L 41/145; H04L 67/12; G06N 7/005; G01S 3/80; G06F 17/50
See application file for complete search history.

(56) References Cited

U.S. PATENT DOCUMENTS

| | | | | |
|---|---|---|---|---|
| 11,592,828 | B2 * | 2/2023 | Bramley | G05D 1/43 |
| 11,870,647 | B1 * | 1/2024 | Zhang | H04L 41/5051 |
| 12,395,492 | B2 * | 8/2025 | Poetter | H04L 41/0803 |
| 2014/0058705 | A1 * | 2/2014 | Brill | G01N 35/00 |
| | | | | 702/183 |
| 2014/0363076 | A1 * | 12/2014 | Han | G06F 18/2155 |
| | | | | 382/159 |
| 2015/0289078 | A1 * | 10/2015 | Kim | H04W 8/02 |
| | | | | 455/422.1 |
| 2017/0234560 | A1 * | 8/2017 | Novotny | F24F 11/30 |
| | | | | 361/679.01 |

(Continued)

OTHER PUBLICATIONS

Kaustav Basu. 2019. Identification of the source (s) of misinformation propagation utilizing identifying codes. In Companion Proceedings of The 2019 World Wide Web Conference. 7-11 pages.

(Continued)

*Primary Examiner* — Chris Parry
*Assistant Examiner* — Hassan Abdur-Rahman Khan
(74) *Attorney, Agent, or Firm* — Polsinelli PC

(57) ABSTRACT

A system provides the minimum number of sensors that will be needed to uniquely identify locations where anomalous behavior is sensed that can be deployed within the specified budget. The system applies an Integer Linear Programming formulation and a Maximum Set-Group Cover (MSGC) formulation. One implementation of the system is applied to detect contaminants in a water distribution system.

18 Claims, 8 Drawing Sheets

(56) References Cited

U.S. PATENT DOCUMENTS

| | | | | |
|---|---|---|---|---|
| 2018/0145885 A1* | 5/2018 | Rao | ..................... | H04L 43/022 |
| 2018/0146322 A1* | 5/2018 | Altay | ..................... | H04W 4/70 |
| 2019/0089123 A1* | 3/2019 | Husko | ..................... | H01S 5/30 |
| 2020/0067787 A1* | 2/2020 | Patra | ..................... | H04L 67/12 |
| 2020/0104425 A1* | 4/2020 | Shin | ..................... | G06F 16/904 |
| 2021/0006470 A1* | 1/2021 | Hotta | ..................... | H04L 41/12 |
| 2022/0057786 A1* | 2/2022 | Phan | ..................... | G06N 3/08 |
| 2024/0084561 A1* | 3/2024 | Yu | ..................... | E03B 7/003 |
| 2024/0117612 A1* | 4/2024 | Lenger | .................. | E03B 7/003 |
| 2024/0119266 A1* | 4/2024 | Tian | ..................... | G06F 18/29 |
| 2025/0247858 A1* | 7/2025 | Talarico | ............ | H04W 74/0808 |

OTHER PUBLICATIONS

Kaustav Basu, Sanjana Dey, Subhas Nandy, and Arunabha Sen. 2019. Sensor networks for structural health monitoring of critical infrastructures using identifying codes. In 2019 15th International Conference on the Design of Reliable Communication Networks (DRCN). IEEE, 43-50 pages.

Kaustav Basu, Malhar Padhee, Sohini Roy, Anamitra Pal, Arunabha Sen, Matthew Rhodes, and Brian Keel. 2018. Health monitoring of critical power system equipments using identifying codes. In International Conference on Critical Information Infrastructures Security. Springer, 29-41 pages.

Kaustav Basu and Arunabha Sen. 2019. Monitoring individuals in drug trafficking organizations: A social network analysis. In 2019 IEEE/ACM International Conference on Advances in Social Networks Analysis and Mining (ASONAM). IEEE, 480-483 pages.

Kaustav Basu and Arunabha Sen. 2019. On augmented identifying codes for monitoring drug trafficking organizations. In 2019 IEEE/ACM International Conference on Advances in Social Networks Analysis and Mining (ASONAM). IEEE, 1136-1139 pages.

Kaustav Basu and Arunabha Sen. 2021. Epidemiological Model Independent Misinformation Source Identification. (2021), 9 pages.

Kaustav Basu and Arunabha Sen. 2021. Identifying individuals associated with organized criminal networks: a social network analysis. Social Networks 64 (2021), 42-54 pages.

Kaustav Basu, Chenyang Zhou, Arunabha Sen, and Victoria Horan Goliber. 2018. A novel graph analytic approach to monitor terrorist networks. In 2018 IEEE International Conference on Social Computing & Networking (SocialCom). IEEE, 1159-1166 pages.

Basu, "Sensor Network Design for Uniquely Identifying Sources of Contamination in Water Distribution Networks", (Paper) 2022, pp. 1-6, WWW '22 Companion, Lyon, France.

Md Zakirul Alam Bhuiyan, Guojun Wang, Jiannong Cao, and Jie Wu. 2014. Sensor placement with multiple objectives for structural health monitoring. ACM Transactions on Sensor Networks (TOSN) 10, 4 (2014), 1-45 pages.

Mihaela Cardei and Jie Wu. 2004. Coverage in wireless sensor networks. Handbook of sensor networks 21 (2004), 201-202 pages.

Demetrios G Eliades and Marios M Polycarpou. 2009. A fault diagnosis and security framework for water systems. IEEE Transactions on Control Systems Technology 18, 6 (2009), 1254-1265 pages.

Florent Foucaud. 2015. Decision and approximation complexity for identifying codes and locating-dominating sets in restricted graph classes. Journal of discrete algorithms 31 (2015), 48-68 pages.

Gerhard P Hancke, Gerhard P Hancke Jr, et al. 2013. The role of advanced sensing in smart cities. Sensors 13, 1 (2013), 393-425 pages.

William E Hart and Regan Murray. 2010. Review of sensor placement strategies for contamination warning systems in drinking water distribution systems. Journal of Water Resources Planning and Management 136, 6 (2010), 611-619 pages.

[16] Mark G Karpovsky, Krishnendu Chakrabarty, and Lev B Levitin. 1998. On a new class of codes for identifying vertices in graphs. IEEE transactions on information theory 44, 2 (1998), 599-611 pages.

Samir Khuller, Anna Moss, and Joseph Seffi Naor. 1999. The budgeted maximum coverage problem. Information processing letters 70, 1 (1999), 39-45 pages.

Jon Kleinberg and Eva Tardos. 2006. Algorithm design. Pearson Education, 432 pages.

Andreas Krause, Jure Leskovec, Carlos Guestrin, Jeanne VanBriesen, and Christos Faloutsos. 2008. Efficient sensor placement optimization for securing large water distribution networks. Journal of Water Resources Planning and Management 134, 6 (2008), 516-526 pages.

Moshe Laifenfeld, Ari Trachtenberg, Reuven Cohen, and David Starobinski. 2009. Joint monitoring and routing in wireless sensor networks using robust identifying codes. Mobile networks and applications 14, 4 (2009), 415-432 pages.

Byoung Ho Lee and Rolf A Deininger. 1992. Optimal locations of monitoring stations in water distribution system. Journal of Environmental Engineering 118, 1 (1992), 4-16 pages.

Dieyan Liang, Hong Shen, and Lin Chen. 2021. Maximum Target Coverage Problem in Mobile Wireless Sensor Networks. Sensors 21, 1 (2021), 184 pages.

Adam B. Noel, Abderrazak Abdaoui, Tarek Elfouly, Mohamed Hossam Ahmed, Ahmed Badawy, and Mohamed S. Shehata. 2017. "Structural Health Monitoring Using Wireless Sensor Networks: A Comprehensive Survey." IEEE Communications Surveys Tutorials vol. 19, No. 3 (2017), pp. 1403-1423. https://doi.org/10.1109/COMST.2017.2691551.

University of Kentucky. 2001. Kentucky Water Resources Research Institute. Retrieved Jan. 30, 2022, pp. 2. from https://uknowledge.uky.edu/kwrri/.

Malhar Padhee, Reetam Sen Biswas, Anamitra Pal, Kaustav Basu, and Arunabha Sen. 2020. Identifying unique power system signatures for determining vulnerability of critical power system assets. Acm Sigmetrics Performance Evaluation Review vol. 47, No. 4 (Mar. 2020), pp. 8-11.

Saikat Ray, Rachanee Ungrangsi, De Pellegrini, Ari Trachtenberg, and David Starobinski. 2003. Robust location detection in emergency sensor networks. In IEEE Infocom 2003. Twenty-second Annual Joint Conference of the IEEE Computer and Communications Societies (IEEE Cat. No. 03CH37428), vol. 2. IEEE, pp. 1044-1053.

Arunabha Sen, Victoria Horan Goliber, Chenyang Zhou, and Kaustav Basu. Jun. 2018. "Terrorist Network Monitoring with Identifying Code." In International Conference on Social Computing, Behavioral-Cultural Modeling and Prediction and Behavior Representation in Modeling and Simulation. Springer, pp. 329-339.

Sailik Sengupta, Kaustav Basu, Arunabha Sen, and Subbarao Kambhampati. 2020. Moving target defense for robust monitoring of electric grid transformers in adversarial environments. In International Conference on Decision and Game Theory for Security. Springer, 241-253.

Abhishek Tripathi, Hari Prabhat Gupta, Tanima Dutta, Rahul Mishra, KK Shukla, and Satyabrat Jit. 2018. "Coverage and connectivity in WSNs: A survey, research issues and challenges." IEEE Access 6 (Jun. 5, 2018), pp. 26971-26992.

Bang Wang. 2011. "Coverage problems in sensor networks: A survey." ACM Computing Surveys (CSUR) vol. 43, No. 4 (Oct. 2011), pp. 1-53.

Leonidas G Anthopoulos. 2017. The smart city in practice. In Understanding Smart Cities: A Tool for Smart Government or an Industrial Trick? Springer, pp. 47-185 (Book only).

Nordine Quadar, Abdellah Chehri, Gwanggil Jeon, and Awais Ahmad. 2021. Smart water distribution system based on IoT networks, a critical review. Human Centred Intelligent Systems (2021), pp. 293-303 (Book only).

* cited by examiner

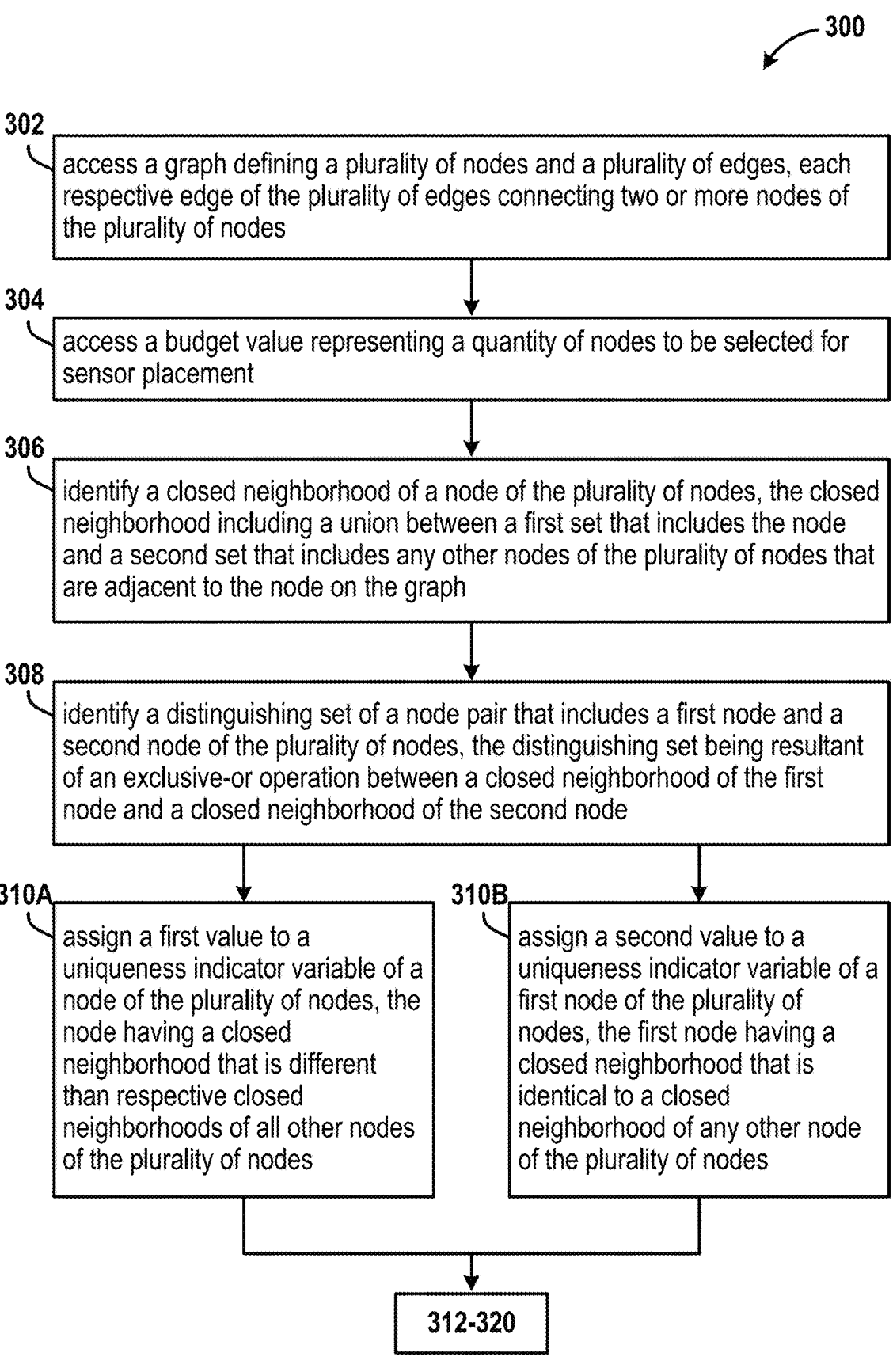

300

302
access a graph defining a plurality of nodes and a plurality of edges, each respective edge of the plurality of edges connecting two or more nodes of the plurality of nodes 304
access a budget value representing a quantity of nodes to be selected for sensor placement 306
identify a closed neighborhood of a node of the plurality of nodes, the closed neighborhood including a union between a first set that includes the node and a second set that includes any other nodes of the plurality of nodes that are adjacent to the node on the graph 308
identify a distinguishing set of a node pair that includes a first node and a second node of the plurality of nodes, the distinguishing set being resultant of an exclusive-or operation between a closed neighborhood of the first node and a closed neighborhood of the second node 310A
assign a first value to a uniqueness indicator variable of a node of the plurality of nodes, the node having a closed neighborhood that is different than respective closed neighborhoods of all other nodes of the plurality of nodes 310B
assign a second value to a uniqueness indicator variable of a first node of the plurality of nodes, the first node having a closed neighborhood that is identical to a closed neighborhood of any other node of the plurality of nodes 312-320

FIG. 5A

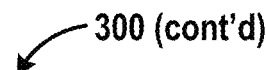

300 (cont'd)

302-310

312
select a subset of nodes from the plurality of nodes, a cardinality value of the subset of nodes correlating with the budget value 314
evaluate, for each selected node of the subset of selected nodes, a coverage constraint with respect to the plurality of nodes of the graph 316
evaluate, for each selected node of the subset of selected nodes, a unique coverage constraint with respect to the plurality of nodes of the graph 318
evaluate, for the subset of selected nodes, a sum of uniqueness indicator variables for each node of the plurality of nodes of the graph 320
identify an optimal subset of selected nodes having a cardinality value that is less than or equal to the budget value, that maximizes a sum of uniqueness indicator variables for each node of the plurality of nodes of the graph, and that jointly satisfies the coverage constraint and the unique coverage constraint with respect to each node of the plurality of nodes

FIG. 5B

SYSTEMS AND METHODS BUDGET-CONSTRAINED SENSOR NETWORK DESIGN FOR DISTRIBUTION NETWORKS

CROSS REFERENCE TO RELATED APPLICATIONS

This is a non-provisional application that claims benefit to U.S. Provisional Application Ser. No. 63/457,283, filed on Apr. 5, 2023, which is herein incorporated by reference in its entirety.

FIELD

The present disclosure generally relates to sensor network design, and in particular, to a system and associated method for budget-constrained sensor network design that ensures unique sensor signatures for each sensor of a sensor network.

BACKGROUND

Sensors are used extensively for monitoring various signals so that any anomalous behavior can easily be detected. In most sensor networks, it is assumed that each sensor has a specific sensing range associated with it. Present methods of configuring sensor networks have limitations in that they often lack unique identification capability for locations where anomalous behavior is sensed-further, sensor networks are often limited by budget.

It is with these observations in mind, among others, that various aspects of the present disclosure were conceived and developed.

BRIEF DESCRIPTION OF THE DRAWINGS

FIG. 2A shows a general overview, FIG. 2B shows evaluation of a coverage constraint, and FIG. 2C shows evaluation of a unique coverage constraint;

FIGS. 5A and 5B are a pair of process flow diagrams showing a computer-implemented method for selecting an optimal subset of nodes of a sensor network graph for sensor placement that corresponds with the framework of FIGS. 2A-2C.

Corresponding reference characters indicate corresponding elements among the view of the drawings. The headings used in the figures do not limit the scope of the claims.

DETAILED DESCRIPTION

1. Introduction

Figure 1:
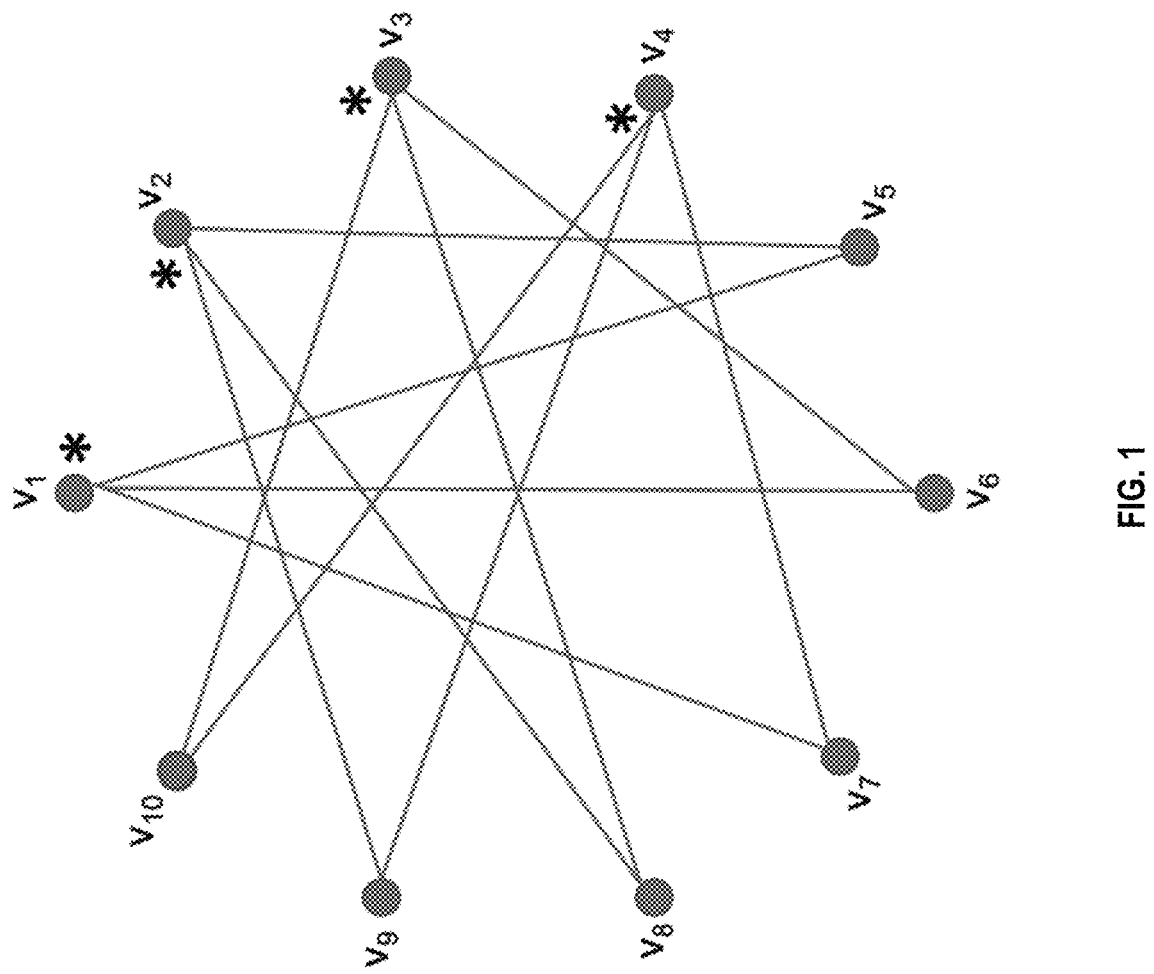
FIG. 1 is a graphical representation showing an example sensor network graph.

A system and associated methods for budget-constrained configuration of sensor networks are disclosed herein. Sensors are being extensively adopted for use in smart cities to monitor various parameters, so that any anomalous behaviors manifesting in the deployment area can be easily detected. Sensors in a deployment area have two functions: sensing/coverage and communication, with the present disclosure focusing on the former. Over the years, several coverage models have been proposed which utilize the Set Cover based problem formulation; this formulation unfortunately has a drawback, in the sense that it lacks unique identification capability for the location where anomalous behavior is sensed. The present disclosure provides strategies for overcoming this limitation by considering an Identifying Code problem formulation, where an optimal solution of the Identifying Code problem provides a minimum quantity of sensors that will be needed to uniquely identify the location where anomalous behavior is sensed. In particular, the present disclosure outlines a computer-implemented system (hereinafter, "system") that seeks a solution to a budget-constrained version of Identifying Code problem, whose goal is to find the largest number of locations that can be uniquely identified with the sensors that can be deployed within the specified budget. The present disclosure outlines an Integer Linear Programming formulation and a Maximum Set-Group Cover (MSGC) formulation for the Identifying Code problem, and further provides a proof that the MSGC problem cannot have a polynomial time approximation algorithm with a $1/k$ factor performance guarantee unless P=NP.

The Set Cover problem formulation can be summarized in the following way. Assume that a set of sensors of a sensor network, $S=\{S_1, \ldots, S_n\}$, is placed in a deployment area to monitor a set of Points-of-Interest, $P=\{p_1, \ldots, p_m\}$. Suppose that a subset $P'\subseteq P$ is within the sensing range of a specific sensor $S_i\in S$. In this situation, if any point $p_j\in P'$ starts behaving anomalously, this behavior will be registered by sensor $S_i$. However, $S_i$ will not be able to determine whether the misbehaving device is at point $p_j$ or any other point $p_k$, as long as $p_k$ is also within the sensing range of $S_i$, i.e., $p_k\in P'$. This limitation also exists in the max k-cover problem, a variation of the Set Cover problem.

Validation studies presented herein apply the system to optimize sensor placement for detecting sources of contaminants in Water Distribution Networks (WDNs). WDNs were selected for validation studies because of (i) their obvious importance as a critical infrastructure to smart cities; (ii) they have been extensively studied by other researchers; and (iii) synthetic and real WDN graphs are readily available in the public domain for conducting experiments. Previous works have primarily utilized budgeted sensor placement approaches (max k-cover) for the detection of contaminants in such networks. In contrast, this disclosure outlines an approach which can not only detect contaminants but also identify its sources, utilizing the concept of ICs.

2. Related Work

The coverage aspect of sensor networks alone has been studied extensively. For example, the survey on Coverage Problems in Sensor Networks, references close to 200 papers. Thus, a multitude of sensor coverage models, such as (i) Boolean Sector Coverage Model, (ii) Boolean Disc Coverage Model, (iii) Attenuated Disc Coverage Model, (iv) Truncated Attenuated Disc Models, (v) Estimation Coverage Models, etc. have been studied by various research groups. A more recent survey lists additional studies on the topic. One study classified coverage problems into three broad classes, (i) Point Coverage, (ii) Area Coverage, and (iii) Barrier Coverage. In the area coverage problem, an entire area (in two- or three-dimensional space) has to be sensed (monitored); while in the point coverage problem, only a specified set of points (points of interest) in 2D or 3D space, has to be monitored. Oftentimes, there are restrictions on the locations (in 2D/3D space), where the sensors can be deployed (cost, terrain, natural elements, etc.), thereby reducing the number of available placement locations.

Generally, sensor coverage problems consider a deployment area where Points of Interest (PoI) are located and the sensors have to be deployed. A deployment area can be thought of as an (infinite) set of points in a two- or three-dimensional space. If R, P and Q denote the (infinite) set of points in the deployment area, PoIs in the deployment area and potential locations for sensor placement respectively, then four different case scenarios can be considered, (i) R=P=Q, (ii) R=P and Q⊂R, (iii) P=Q and P, Q⊂R, and (iv) P≠Q and P, Q⊂R. The cases 1 and 2 are considered as Area Coverage problems whereas cases 3 and 4 are considered as Point Coverage problems, which is the focus of the present disclosure.

The most frequently-studied problem in this context is Sensor Placement Optimization, whose goal is to find the smallest set of locations to deploy sensors, so that all the points of interest can be monitored. If a Boolean disc coverage model is used for sensor coverage, the Sensor Placement Optimization problem can be formulated as a Set Cover problem and a number of studies using this model are available in the literature. Sensor placement for the detection of anomalies in smart cities have also been previously studied, where one work describes technologies utilized in sensing locations of interest in smart cities (with a case study on a water distribution network). However, as pointed out in Section 1, the Set Cover based approach has a serious limitation which can be overcome by utilizing Identifying Code.

Identifying Codes (IC) have been studied from both a theoretical perspective and an applicative perspective. One work studied joint monitoring and routing in wireless sensor networks with IC. Another work studied the location detection problem in emergency sensor networks, using IC and presented an algorithm for generating irreducible IC in polynomial time. Note that an irreducible IC is only a minimal IC and may not be the minimum (or optimal) IC. Previous efforts presented Integer Linear Programs for the computation of a minimum IC set for problems arising from multiple domains, varying from drug/terrorist network monitoring to monitoring critical infrastructures. Another work utilized Moving Target Defense and IC to present an approach which prevented cyber-attacks on sensors placed in critical infrastructures. The problem of identifying misinformation spreaders in social networks was also studied using ICs. One study utilized ICs for identifying vulnerable assets in critical power systems.

While the goal of all these studies was to find the minimum number of sensors to monitor all PoIs, the present disclosure considers a budget constrained version, where the quantity of sensors that can be deployed is limited by a pre-approved budget. One aim of the present system is to maximize the number of PoIs that can be monitored with the limited number of sensors that can be procured and deployed. Moreover, the present disclosure shows how the approach outlined herein can help with the monitoring of Smart Cities.

3. Overview of Identifying Codes

Identifying Code in its simplest form is defined as follows:

Definition 3.1. A vertex set V' of an undirected graph G=(V,E) is defined as the Identifying Code Set (ICS) for the vertex set V, if for all v E V,$N^+[v] \cap V'$ is unique where, $N^+[v]=v \cap N(v)$ and $N(v)$ represents the set of nodes adjacent to v in G=(V, E). The Minimum Identifying Code Set (MICS) problem is to find the Identifying Code Set of smallest cardinality.

TABLE 1

| $N^+[v] \cap V'$ results for all $v \in V$ for the graph in FIG. 1 | |
| --- | --- |
| $N^+[v_1] \cap V' = \{v_1\}$ | $N^+[v_2] \cap V' = \{v_2\}$ |
| $N^+[v_3] \cap V' = \{v_3\}$ | $N^+[v_4] \cap V' = \{v_4\}$ |
| $N^+[v_5] \cap V' = \{v_1, v_2\}$ | $N^+[v_6] \cap V' = \{v_1, v_3\}$ |
| $N^+[v_7] \cap V' = \{v_1, v_4\}$ | $N^+[v_8] \cap V' = \{v_2, v_3\}$ |
| $N^+[v_9] \cap V' = \{v_2, v_4\}$ | $N^+[v_{10}] \cap V' = \{v_3, v_4\}$ |

The vertices of the set V' may be viewed as alphabets of the code, and the string made up by the concatenation of the alphabets of $N^+[v] \cap V'$, may be viewed as the unique "code" (or signature) for the node v. For instance, consider the graph G=(V, E) shown in FIG. 1. In this graph $V'=\{v_1, v_2, v_3, v_4\}$ is an ICS; as shown in Table 1, $N^+[v] \cap V'$ is unique for all $v \in V$. From the table, it can be seen that the code for node $v_1$ is $v_1$, the code for $v_5$ is $v_1, v_2$, the code for $v_{10}$ is $v_3, v_4$, etc. The necessary and sufficient condition for a graph to have an Identifying Code is that G=(V, E) be "twin"-free. Two nodes u, $v \in V$ are said to be "twins" if $N^+[v]=N^+[u]$. The definition of the MICS problem for a directed graph is similar to that of the undirected graph and is defined as follows:

Definition 3.2. A vertex set V' of a directed graph G=(V, E) is defined as the ICS for the vertex set V, if for all $v \in V, N^{out}[v] \cap V'$ is unique where, $N^{out}[v]=v$ U $N^{out}(v)$ and $N^{out}(v)$ represents the set of out-neighbors of v in G=(V, E). As before, the Minimum Identifying Code Set (MICS) problem is to find the Identifying Code Set of smallest cardinality.

From Points on the Plane to Graphs: Section 1 provides a description of the sensor placement problem in terms of two sets of points in a plane, whereas the MICS problem is described in terms of a graph. From the set of points S and P, a graph can be constructed using the following construction rules: (i) For each point $S_i \in S$ and each point $p_i \in P$, a node can be "created" in the graph. Thus, a node set V in the graph G=(V, E), is $V_S \cup V_P$. If a point $p_i \in P$ is within the sensing range of a sensor $S_j$, then there is an edge in the graph connecting the nodes $v_{p_i}$ and $v_{S_j}$, where $v_{p_i}$ and $v_{S_j}$ are the nodes corresponding to the points $p_i$ and $S_j$ respectively.

Budget Constrained Identifying Code Set (BCICS) Problem: Given a graph G=(V, E) and an integer B, a subset $V' \subseteq V$ of cardinality at most B is called the Budget Constrained Identifying Code Set of G=(V, E), if it maximizes |V"|, where $V'' \subseteq V$ and for no two nodes $v_i$, $v_j$, such that $v_i \in V''$ and $v_j \in V$, $N^+(v_i) \cap V' \neq N^+(v_j) \cap V'$.

It may be recalled that one main objective of the present system is to deploy sensors that can be procured within the specified budget, as judiciously as possible, so as to maximize the number of locations (points of interest) that can have unique fault identification signatures.

4. Solutions for BCICS Problems

Section 4.1 of the present disclosure first shows that BCICS can be set up as a generalization of the well-studied Maximum Set Cover (MSC) problem, referred to herein as a Maximum Set-Group Cover (MSGC) problem. Section 4.2 of the present disclosure outlines an optimal solution to the BCICS problem as applied by the present system.

4.1. Maximum Set-Group Cover Formulation of BCICS Problem

For convenience, this section first states the MSC problem followed by the MSGC problem. Then, the present disclosure outlines an example showing how the generalization of MSC to MSGC can be used to solve the BCICS problem.

Definition 4.1. Set Cover (SC) Problem: Given a set $A=\{a_1, \ldots, a_n\}$ and $\mathcal{A}'\{A'_1, \ldots, A'_n\}$ ($A'_i \subseteq A$, $1 \leq i \leq m$), find the smallest subset $\mathcal{A}'' \subseteq \mathcal{A}'$ such that all the elements in the set $A$ is covered, i.e., every element of $A$ belong to at least one member of $\mathcal{A}''$.

Definition 4.2. Maximum Set Cover (MSC) Problem: Given a set $A=\{a_1, \ldots, a_n\}$ and subsets $\mathcal{A}'=\{A'_1, \ldots, A'_m\}$ ($A'_i \subseteq A$, $1 \leq i \leq m$) and an integer B, find the largest subset $A'' \subseteq A$ that can be covered by using a subset $\mathcal{A}''' \subseteq \mathcal{A}'$, where $|\mathcal{A}'''| \leq B$.

Definition 4.3. Maximum Set-Group Cover (MSGC) Problem: Given a set $A=\{a_1, \ldots, a_n\}$ and subsets $\mathcal{A}'=\{A'_1, \ldots, A'_m\}$ ($A'_i \subseteq A$, $1 \leq i \leq m$) and $G=\{G_1, \ldots, G_p\}$ ($G_i \subseteq A$, $1 \leq i \leq p$) and an integer B, find the subset $A'' \subseteq \mathcal{A}'$ with $|A''|=B$ that maximizes the number of groups completely "covered" by A'', i.e., it finds the largest cardinality subset $G' \subseteq G$ that satisfies the condition that $\forall G_j \in G', \cup_{A'_i \in A''} A'_i \cap G = G_j$.

The formulation of the BCICS problem can be elaborated on as an MSGC problem with the help of the example shown in FIG. 1.

Definition 4.4. Closed Neighborhood of $v_i=CN(v_i)=N^+(v_i)$, where $N^+(v_i)=N(v_i) \cup \{v\}$, and $N(v_i)$ is the set of nodes adjacent to $v_i$.

Definition 4.5. Distinguishing Set for $v_i$ and $v_j=DS(v_i, v_1)=CN(v_i) \oplus CN(v_j)$ where $\oplus$ denotes Exclusive-OR operation. At least one element of the set must be selected to distinguish between the nodes $v_i$ and $v_j$.

Definition 4.6. Isolation Set for $v_i=IS(v_i)=u_{j=1}^n\{v_i:v_i \in DS(v_i, v_j)\}$, $j \neq i$. This is the set of sets, such that if all nodes in a set is selected, it will distinguish (isolate/uniquely identify) $v_i$ from all other nodes of the graph.

Definition 4.7. Presence Set for $v_i$, $PS(v_i)=\{CN(v_j): v_i \in CN(v_j)\} \cup \{DS(v_j, v_k): v_i \in DS(v_j, v_k)\}$, $\forall v_i, v_j, v_k, 1 \leq v_i, v_j, v_k \leq n$. $PS(v_i)$ is the set of all $CN(v_j)$s and $DS(v_i, v_j)$s, where $v_i$ is present.

In one non-limiting example shown in FIG. 1, a quantity of nodes in the graph is 10, i.e., n=10. Accordingly, there will be 10 $CN(v_i)$ sets and corresponding to each $v_i$, there will be 9 $DS(v_i, v_j)$ sets, ($\forall v_i, v_j \neq v_i$). Hence, there will be 100 sets altogether. However, it may be noted that these 100 sets will not be distinct, as $DS(v_i, v_j)=DS(v_j, v_i)$. Thus, the total number of distinct $DS(v_i, v_j)$ sets in this example will be $E_{i=1}^{n-1}$ i=45 (as n=10). These 10 $CN(v_i)$ and 45 $DS(v_i, v_j)$ sets are shown in Table 2, and are marked as $a_1$ through $a_{55}$. The Presence Sets for nodes 1 through 10 for the example graph, are shown in Table 3. The Isolation Sets for nodes 1 through 10 for the example graph, are shown in Table 4.

The BCICS problems can be viewed as an MSGC problem in the following way. It can be said that $PS(v_j)$ "hits" $CN(v_j)$ if $PS(v_i) \cap CN(v_j) \neq \emptyset$. Similarly, $PS(v_i)$ "hits" $DS(v_j, v_k)$ if $PS(v_i) \cap DS(v_j, v_k) \neq \emptyset$. For the purposes of the present disclosure, the term "covers" will be used herein instead of "hits", e.g., one can say $PS(v_i)$ "covers" $CN(v_j)$ if $PS(v_i) \cap CN(v_j) \neq \emptyset$ and "covers" $DS(v_j, v_k)$ if $PS(v_i) \cap DS(v_j, v_k) \neq \emptyset$. In Table 2, the $CN(v_j)$ and $DS(v_j, v_k)$ sets are numbered from $a_1$ through $a_{10}$ and $a_{11}$ through $a_{55}$ respectively ($A=\{a_1, \ldots, a_{55}\}$). Each $PS(v_i)$ is a subset of the set A, and is denoted as $A'(v_i)$ in Table 3, defining the set $A'=\{A', \ldots, A'_0\}$. From Tables 2 and 3, it can be seen that $A'(1)=PS(1)$ covers $a_1=CN(1)$, $a_5=CN(9)$, $a_{37}=DS(4,7)$ and 25 other $CN(v_i)$ or $DS(v_j, v_k)$ sets shown in the first row of Table 3. The set G is defined as the $IS(v_i)$, $1 \leq i \leq 10$, i.e., $G=\{G_1, \ldots, G_{10}\}$. Hence, the BCICS problem can be formulated as a MSGC problem.

Note that the MSC problem can be considered a generalization of the SC problem, and the MSGC problem can be considered a generalization of the MSC problem. As SC is a well-known NP-complete problem, it can easily be verified that both MSC and MSGC problems are NP-Complete. However, unlike the SC problem for which a log n factor approximation algorithm exists, and for the MSC problem for which a (1−1/e) factor approximation algorithm exists; in the following, the present disclosure shows that 1/k factor approximation algorithm (k>1) for the MSGC problem cannot exist unless P=NP.

TABLE 2

| CN ($v_i$) and DS($v_i$, $v_j$) Table for all i, j, $1 \leq i, j \leq n$; $A = \{a_1, \ldots, a_{55}\}$ | | | |
|---|---|---|---|
| $a_1 = CN(1) = \{1, 5, 6, 7\}$ | $a_2 = CN(2) = \{2, 5, 8, 9\}$ | $a_3 = CN(3) = \{3, 6, 8, 10\}$ | $a_4 = CN(4) = \{4, 7, 9, 10\}$ |
| $a_5 = CN(5) = \{1, 2, 5\}$ | $a_6 = CN(6) = \{1, 3, 6\}$ | $a_7 = CN(7) = \{1, 4, 7\}$ | $a_8 = CN(8) = \{2, 3, 8\}$ |
| $a_9 = CN(9) = \{2, 4, 9\}$ | $a_{10} = CN(10) = \{3, 4, 10\}$ | $a_{11} = DS(1, 2) = \{1, 2, 6, 7, 8, 9\}$ | $a_{12} = DS(1, 3) = \{1, 3, 5, 7, 8, 10\}$ |
| $a_{13} = DS(1, 4) = \{1, 4, 5, 6, 9, 10\}$ | $a_{14} = DS(1, 5) = \{2, 6, 7\}$ | $a_{15} = DS(1, 6) = \{3, 5, 7\}$ | $a_{16} = DS(1, 7) = \{4, 5, 6\}$ |
| $a_{17} = DS(1, 8) = \{1, 2, 3, 5, 6, 7, 8\}$ | $a_{18} = DS(1, 9) = \{1, 2, 4, 5, 6, 7, 9\}$ | $a_{19} = DS(1, 10) = \{1, 3, 4, 5, 6, 7, 10\}$ | $a_{20} = DS(2, 3) = \{2, 3, 5, 6, 9, 10\}$ |
| $a_{21} = DS(2, 4) = \{2, 4, 5, 7, 8, 10\}$ | $a_{22} = DS(2, 5) = \{1, 8, 9\}$ | $a_{23} = DS(2, 6) = \{1, 2, 3, 5, 6, 8, 9\}$ | $a_{24} = DS(2, 7) = \{1, 2, 4, 5, 7, 8, 9\}$ |
| $a_{25} = DS(2, 8) = \{3, 5, 9\}$ | $a_{26} = DS(2, 9) = \{4, 5, 8\}$ | $a_{27} = DS(2, 10) = \{2, 3, 4, 5, 8, 9, 10\}$ | $a_{28} = DS(3, 4) = \{3, 4, 6, 7, 8, 9\}$ |
| $a_{29} = DS(3, 5) = \{1, 2, 3, 5, 6, 8, 10\}$ | $a_{30} = DS(3, 6) = \{1, 8, 10\}$ | $a_{31} = DS(3, 7) = \{1, 3, 4, 6, 7, 8, 10\}$ | $a_{32} = DS(3, 8) = \{10, 2, 6\}$ |
| $a_{33} = DS(3, 9) = \{2, 3, 4, 6, 8, 9, 10\}$ | $a_{34} = DS(3, 10) = \{4, 6, 8\}$ | $a_{35} = DS(4, 5) = \{1, 2, 4, 5, 7, 9, 10\}$ | $a_{36} = DS(4, 6) = \{1, 3, 4, 6, 7, 9, 10\}$ |
| $a_{37} = DS(4, 7) = \{1, 9, 10\}$ | $a_{38} = DS(4, 8) = \{2, 3, 4, 7, 8, 9, 10\}$ | $a_{36} = DS(4, 9) = \{2, 7, 10\}$ | $a_{40} = DS(4, 10) = \{3, 7, 9\}$ |

TABLE 2-continued

| CN ($v_i$) and DS($v_i$, $v_j$) Table for all i, j, $1 \leq i, j \leq n$; $A = \{a_1, \ldots, a_{55}\}$ | | | |
|---|---|---|---|
| $a_{41} = DS(5, 6) = \{2, 3, 5, 6\}$ | $a_{42} = DS(5, 7) = \{2, 4, 5, 7\}$ | $a_{43} = DS(5, 8) = \{1, 3, 5, 8\}$ | $a_{44} = DS(5, 9) = \{1, 4, 5, 9\}$ |
| $a_{45} = DS(5, 10) = \{1, 2, 3, 4, 5, 10\}$ | $a_{46} = DS(6, 7) = \{3, 4, 6, 7\}$ | $a_{47} = DS(6, 8) = \{1, 2, 6, 8\}$ | $a_{48} = DS(6, 9) = \{1, 2, 3, 4, 6, 9\}$ |
| $a_{49} = DS(6, 10) = \{1, 4, 6, 10\}$ | $a_{50} = DS(7, 8) = \{1, 2, 3, 4, 7, 8\}$ | $a_{51} = DS(7, 9) = \{1, 2, 7, 9\}$ | $a_{52} = DS(7, 10) = \{1, 3, 7, 10\}$ |
| $a_{53} = DS(8, 9) = \{3, 4, 8, 9\}$ | $a_{54} = DS(8, 10) = \{2, 4, 8, 10\}$ | $a_{55} = DS(9, 10) = \{2, 3, 9, 10\}$ | |

TABLE 3

| PS($v_i$) Table for all i, $1 \leq i \leq n$ |
|---|
| $A'_1 = PS(1) = \{a_1, a_5, a_6, a_7, a_{11}, a_{12}, a_{13}, a_{17}, a_{18}, a_{19}, a_{22}, a_{23}, a_{24}, a_{29}, a_{30}, a_{31}, a_{35}, a_{36}, a_{37}, a_{43}, a_{44}, a_{45}, a_{47}, a_{48}, a_{49}, a_{50}, a_{51}, a_{52}\}$ |
| $A'_2 = PS(2) = \{a_2, a_5, a_8, a_9, a_{11}, a_{14}, a_{17}, a_{18}, a_{20}, a_{21}, a_{23}, a_{24}, a_{27}, a_{29}, a_{32}, a_{33}, a_{35}, a_{38}, a_{39}, a_{41}, a_{42}, a_{45}, a_{47}, a_{48}, a_{50}, a_{51}, a_{54}, a_{55}\}$ |
| $A'_3 = PS(3) = \{a_3, a_6, a_8, a_{10}, a_{12}, a_{15}, a_{17}, a_{19}, a_{20}, a_{23}, a_{25}, a_{27}, a_{28}, a_{29}, a_{31}, a_{33}, a_{36}, a_{38}, a_{40}, a_{41}, a_{43}, a_{45}, a_{46}, a_{48}, a_{50}, a_{52}, a_{53}, a_{55}\}$ |
| $A'_4 = PS(4) = \{a_4, a_7, a_9, a_{10}, a_{13}, a_{16}, a_{18}, a_{19}, a_{21}, a_{24}, a_{26}, a_{27}, a_{28}, a_{31}, a_{33}, a_{34}, a_{35}, a_{36}, a_{38}, a_{42}, a_{44}, a_{45}, a_{46}, a_{48}, a_{49}, a_{50}, a_{53}, a_{54}\}$ |
| $A'_5 = PS(5) = \{a_1, a_2, a_5, a_{12}, a_{13}, a_{15}, a_{16}, a_{17}, a_{18}, a_{19}, a_{20}, a_{21}, a_{23}, a_{24}, a_{25}, a_{26}, a_{27}, a_{29}, a_{35}, a_{41}, a_{42}, a_{43}, a_{44}, a_{45}\}$ |
| $A'_6 = PS(6) = \{a_1, a_3, a_6, a_{11}, a_{13}, a_{14}, a_{16}, a_{17}, a_{18}, a_{19}, a_{20}, a_{23}, a_{28}, a_{29}, a_{31}, a_{32}, a_{33}, a_{34}, a_{36}, a_{41}, a_{46}, a_{47}, a_{48}, a_{49}\}$ |
| $A'_7 = PS(7) = \{a_1, a_4, a_7, a_{11}, a_{12}, a_{14}, a_{15}, a_{17}, a_{18}, a_{19}, a_{21}, a_{24}, a_{28}, a_{31}, a_{35}, a_{36}, a_{38}, a_{39}, a_{40}, a_{42}, a_{46}, a_{50}, a_{51}, a_{52}\}$ |
| $A'_8 = PS(8) = \{a_2, a_3, a_8, a_{11}, a_{12}, a_{17}, a_{21}, a_{22}, a_{23}, a_{24}, a_{26}, a_{27}, a_{28}, a_{29}, a_{30}, a_{31}, a_{33}, a_{34}, a_{38}, a_{43}, a_{47}, a_{50}, a_{53}, a_{54}\}$ |
| $A'_9 = PS(9) = \{a_2, a_4, a_9, a_{11}, a_{13}, a_{18}, a_{20}, a_{22}, a_{23}, a_{24}, a_{25}, a_{27}, a_{28}, a_{33}, a_{35}, a_{36}, a_{37}, a_{38}, a_{40}, a_{44}, a_{48}, a_{51}, a_{53}, a_{55}\}$ |
| $A'_{10} = PS(10) = \{a_3, a_4, a_{10}, a_{12}, a_{13}, a_{19}, a_{20}, a_{21}, a_{27}, a_{29}, a_{30}, a_{31}, a_{32}, a_{33}, a_{35}, a_{36}, a_{37}, a_{38}, a_{39}, a_{45}, a_{49}, a_{52}, a_{54}, a_{55}\}$ |

TABLE 4

| IS($v_i$) Table for all i, $1 \leq i \leq n$ |
|---|
| $G_1 = IS(1) = \{a_1, a_{11}, a_{12}, a_{13}, a_{14}, a_{15}, a_{16}, a_{17}, a_{18}, a_{19}\}$ |
| $G_2 = IS(2) = \{a_2, a_{11}, a_{20}, a_{21}, a_{22}, a_{23}, a_{24}, a_{25}, a_{26}, a_{27}\}$ |
| $G_3 = IS(3) = \{a_3, a_{12}, a_{20}, a_{28}, a_{29}, a_{30}, a_{31}, a_{32}, a_{33}, a_{34}\}$ |
| $G_4 = IS(4) = \{a_4, a_{13}, a_{21}, a_{28}, a_{35}, a_{36}, a_{37}, a_{38}, a_{39}, a_{40}\}$ |
| $G_5 = IS(5) = \{a_5, a_{14}, a_{22}, a_{29}, a_{35}, a_{41}, a_{42}, a_{43}, a_{44}, a_{45}\}$ |
| $G_6 = IS(6) = \{a_6, a_{15}, a_{23}, a_{30}, a_{36}, a_{41}, a_{46}, a_{47}, a_{48}, a_{49}\}$ |
| $G_7 = IS(7) = \{a_7, a_{16}, a_{24}, a_{31}, a_{37}, a_{42}, a_{46}, a_{50}, a_{51}, a_{52}\}$ |
| $G_8 = IS(8) = \{a_8, a_{17}, a_{25}, a_{32}, a_{38}, a_{43}, a_{47}, a_{50}, a_{53}, a_{54}\}$ |
| $G_9 = IS(9) = \{a_9, a_{18}, a_{26}, a_{33}, a_{39}, a_{44}, a_{49}, a_{51}, a_{53}, a_{55}\}$ |
| $G_{10} = IS(10) = \{a_{10}, a_{19}, a_{27}, a_{34}, a_{40}, a_{45}, a_{49}, a_{52}, a_{54}, a_{55}\}$ |

TABLE 5

| Example of creation of an instance of MSGC Problem from an instance of SC Problem | |
|---|---|
| Set Cover | Maximum Set Group Cover |
| $A_{SC} = \{a_1, a_2, a_3\}$ | $A_{MSGC} = \{a_1{}^1, a_2{}^1, a_3{}^1, a_1{}^2, a_2{}^2, a_3{}^2, a_1{}^3, a_2{}^3, a_3{}^3\}$ |
| $A' = \{A_1, A_2\}$ | $A' = \{A_1{}^1, A_1{}^2, A_1{}^3, A_2{}^1, A_2{}^2, A_2{}^3\}$ |
| $A_1 = \{a_1, a_2\}$ | $A_1{}^1 = \{a_1{}^1, a_2{}^1\}, A_1{}^2 = \{a_1{}^2, a_2{}^2\}, A_1{}^3 = \{a_1{}^3, a_2{}^3\}$ |
| $A_2 = \{a_2, a_3\}$ | $A_2{}^1 = \{a_2{}^1, a_3{}^1\}, A_2{}^2 = \{a_2{}^2, a_3{}^2\}, A_2{}^3 = \{a_2{}^3, a_3{}^3\}$ |
| | 5. $G = \{G_1, G_2, G_3\}, G_1 = \{a_1{}^1. a_2{}^1. a_3{}^1\},$ |
| | $G_2 = \{a_1{}^2. a_2{}^2. a_3{}^2\}, G_3 = \{a_1{}^3. a_2{}^3. a_3{}^3\}$ |

THEOREM 4.8. Unless P=NP, there cannot be a polynomial time approximation algorithm for the MSGC problem with a performance factor that guarantees for every instance I of the MSGC problem APP(I)≥⌈OPT(I)/k⌉, where APP(I) and OPT(I) represents the approximate and optimal solutions respectively for the MSGC problem instance I and k is a real number with k>1.

Proof: For the purposes of the proof, if such an algorithm existed, the Set Cover problem, which is known to be NP-complete, could have been solved in polynomial time. Suppose, if possible, such an algorithm $APP_{MSGC}$ exists. From an instance of the SC problem, given as $A_{SC}$= $\{a_1, \ldots, a_n\}$ and $\mathcal{A}'_{SC} = \{A'_1, \ldots, A'_m\}$ ($A'_i \subseteq A_{SC}$, $1 \leq i \leq m$), an instance of the MSGC problem can be created by making n copies of the instance of the SC problem. Thus, $$A_{MSGC} = \{a_1^1, \ldots, a_n^1, a_1^2, \ldots, a_n^2, a_1^n, \ldots, a_n^n\} \tag{1}$$

$$\mathcal{A}'_{MCGC} = \{A_1'^1 m \ldots, A_1'^n, A_2'^1, \ldots, A_m'^n, A_m'^1, \ldots, A_m'^m\} \tag{2}$$

$$(A_j'^i \subseteq A_{MSGC}, 1 \leq i, j \leq n),$$

$$A_j'^i = \{a_k^i \mid a_k \in A_j, \forall i, 1 \leq i \leq n, 1 \leq j \leq m\},$$

$$\mathcal{G}_{MSGC} = \{G_1^{MSGC}, \ldots, G_n^{MSGC}\} \text{ and } G_i^{MSGC} = \{a_1^i, \ldots, a_n^i\},$$

$$\forall i, 1 \leq i \leq n.$$

$$G_i^{MSGC} \subseteq A_{MSGC}, 1 \leq i \leq n$$

An example of construction of an instance of the MSGC problem from an instance of the SC problem is shown in Table 5. Given an instance of the SC problem, using the MSGC instance creation rules above, the corresponding instance of the MSGC problem can be created. If there is a polynomial time approximation algorithm $APP_{MSGC}$ with APP(I)≥⌈OPT(I)/k⌉, performance guarantee, then the polynomial time approximation algorithm can be applied to the instance of the MSGC problem created from the instance of the SC problem. The polynomial time approximation algorithm will either return zero, implying that no group can be completely covered, or a non-zero number, implying that at least one group can be completely covered. If the polynomial time approximation algorithm returns zero, one can conclude that the SC problem has no solution. If the polynomial time approximation algorithm returns a non-zero number, this implies that the SC problem has a solution. Thus, it can be can concluded that if there exists a polynomial time approximation algorithm for the MSGC problem with a performance guarantee of APP(I)≥⌈OPT(I)/k⌉ for some real number k, k≥1, then the SC problem (which is known to be NP-complete) can be solved in polynomial time. This implies that unless P=NP, no such polynomial time approximation algorithm can exist for the MSGC problem.

4.2. Optimal Solution for the BCICS Problem with ILP

Figure 2A:
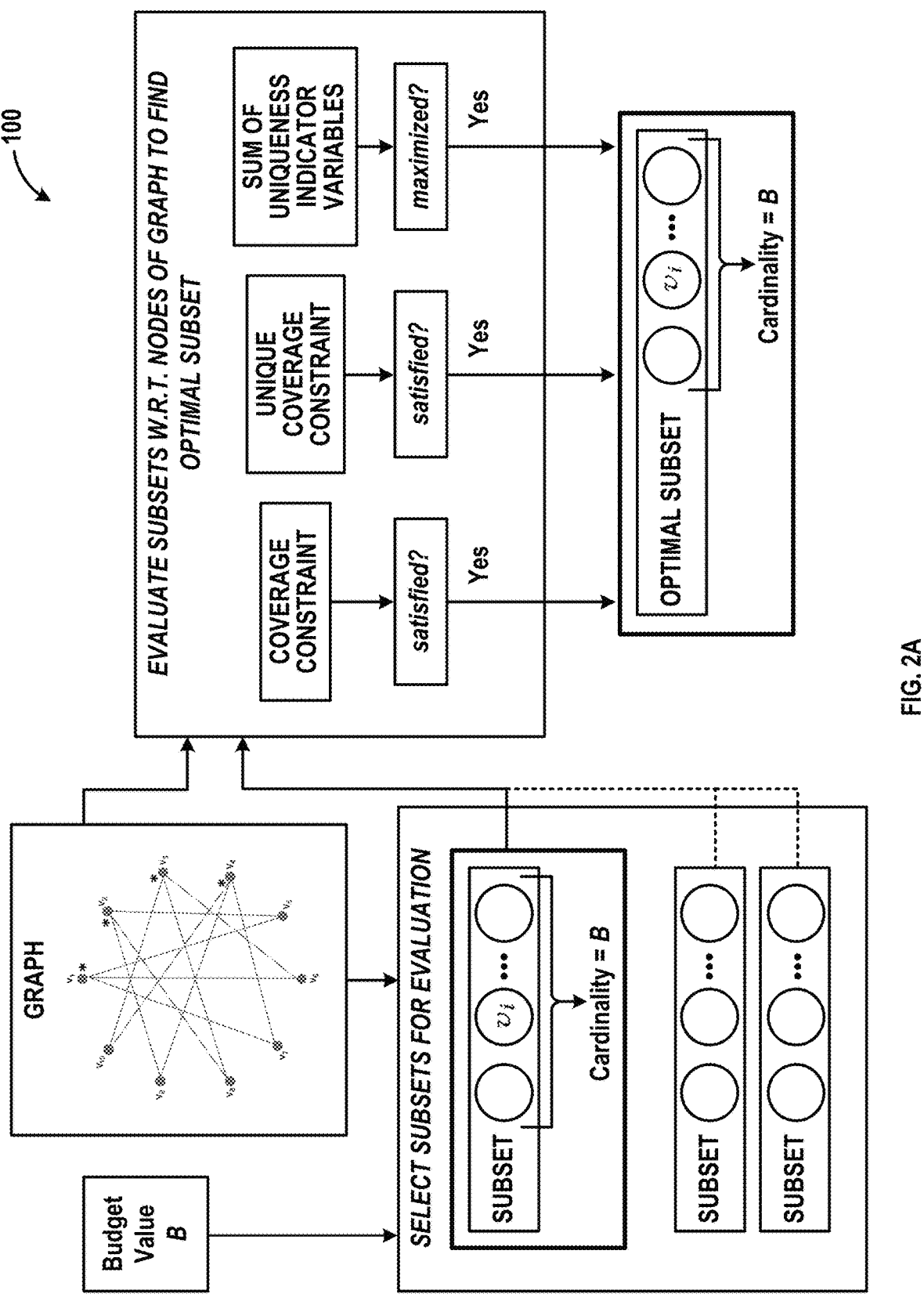
FIGS. 2A-2C are a series of simplified diagrams showing a general framework for selecting an optimal subset of nodes of a sensor network graph for sensor placement, where
Figure 2B:
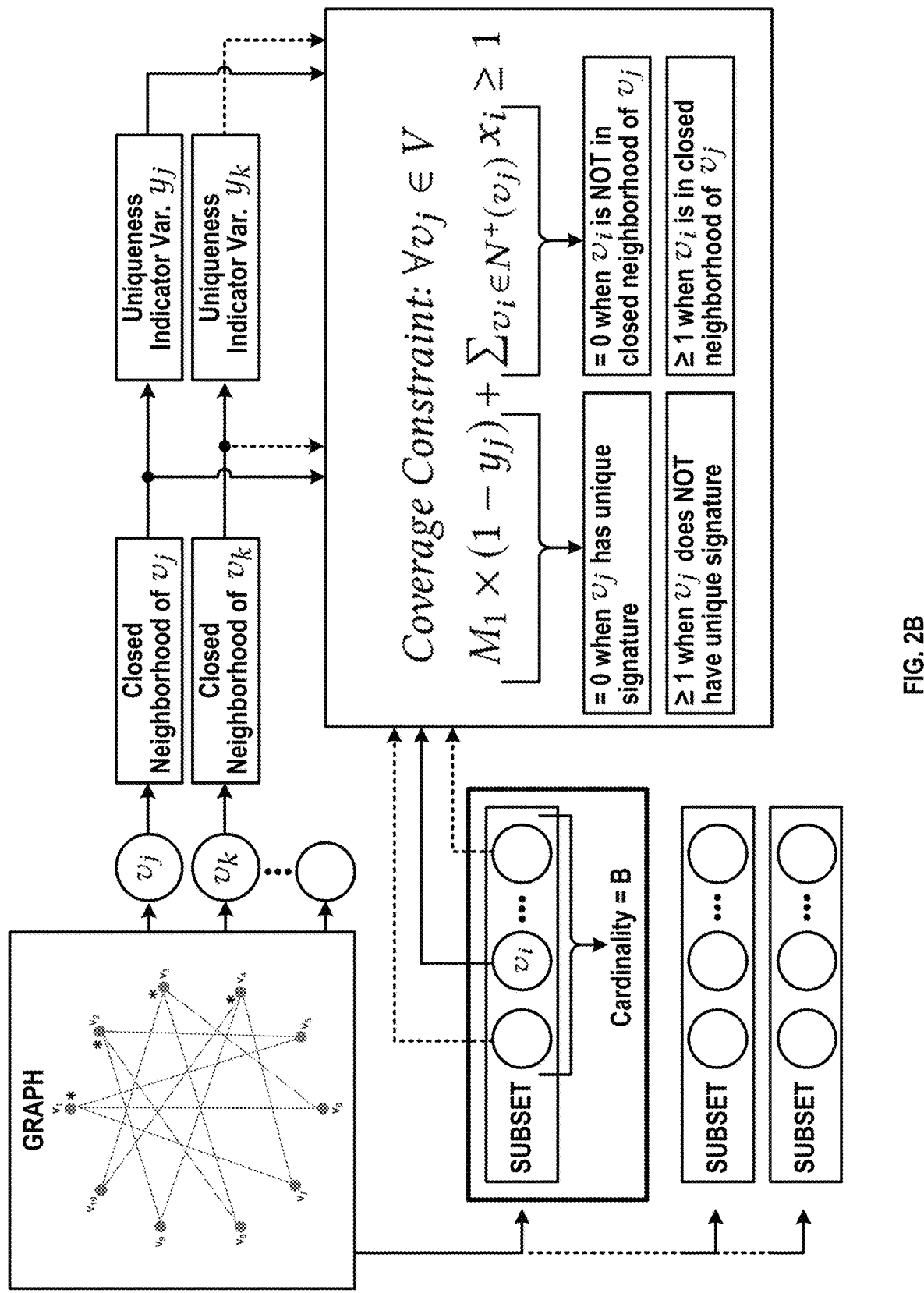
Figure 2C:
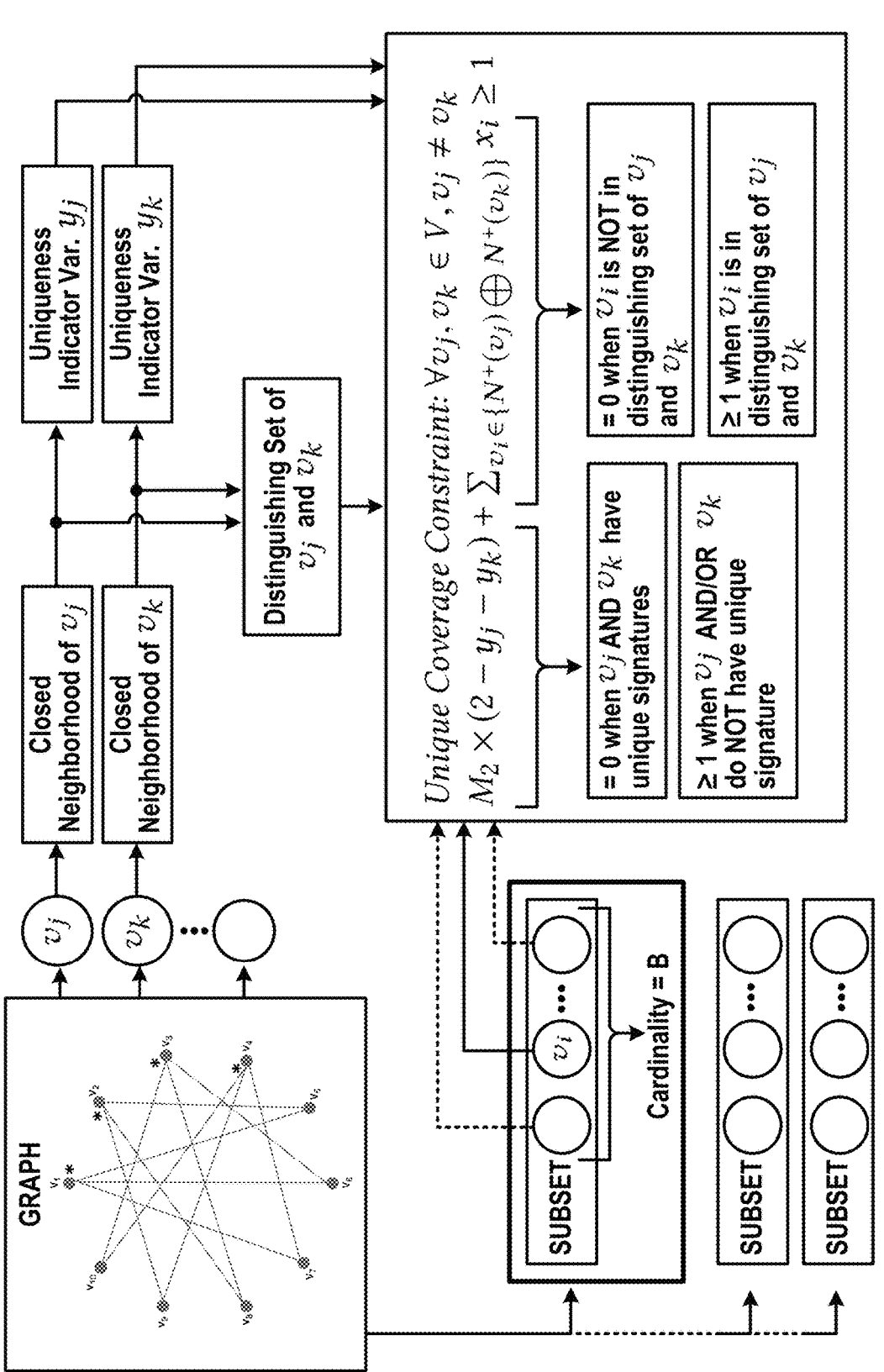

FIGS. 2A-2C show a general framework 100 that can be implemented by a computing device (e.g., computing device 200 outlined herein) for determining an optimal subset of nodes for sensor placement. As shown, a graph defines a plurality of nodes and a plurality of edges, each respective edge of the plurality of edges connecting two or more nodes of the plurality of nodes, and each node being associated with a point of interest. A budget value B represents a maximum quantity of nodes that can be selected for sensor placement. One goal of the present system for solving the BCICS problem is to ensure a unique "signature" for as many nodes as possible, subject to the constraint that the number of nodes where sensor is placed does not exceed the specified budget, B.

However, the "signature" of each node is dependent upon sensor placement (e.g., if no sensor is placed within a "closed neighborhood" of a given node, then there will be no signature associated with the node). As such, the system aims to iteratively suggest subsets of selected nodes (of cardinality B) that could receive sensors and evaluate each subset of selected nodes to find an optimal set.

At each iteration, the system can assign indicator variable values to each node of the plurality of nodes based on the subset of selected nodes for that iteration, where the indicator variable values denote:

a. if a given node receives a sensor or not based on the subset of selected nodes; and b. if a given node has a unique signature relative to those of other nodes based on connections between each respective node and based on which nodes are within the subset of selected nodes.

The system can then use these indicator variable values to evaluate an objective function subject to a plurality of constraints, including constraints on: a) sensor budget (e.g., a quantity of available sensors that dictate how many nodes can receive sensors); b) a coverage constraint (e.g., to ensure that the system takes into account a "closed neighborhood" of each node and maximizes sensor coverage of the graph); and c) a unique coverage constraint (e.g., to maximize usefulness of sensor placement and avoid unnecessary redundancies). The system also aims to maximize a quantity of unique nodes that are covered, e.g., by summation of "uniqueness" indicator variable values. Following evaluation, the system identifies an optimal subset of selected nodes having a cardinality value that is less than or equal to the budget value B, that maximizes a sum of uniqueness indicator variables for each node of the plurality of nodes of the graph, and that jointly satisfies the coverage constraint and the unique coverage constraint with respect to each node of the plurality of nodes.

Instance: The system can receive operating data in the form of a graph G=(V, E) and a constraint value (integer B). In some embodiments, the integer B can be obtained by simple translation of a value (e.g., monetary cost, etc.) to a quantity of available sensors.

Problem: The system aims to identify a subset of selected nodes V'⊆V of cardinality B (i.e., |V'''|=B) such that placement of sensors at these selected nodes ensures that a largest subset of nodes V'' of V has a unique signature associated with it. At each iteration, the system selects a subset of selected nodes V'⊆V of cardinality B and evaluates "coverage" of the graph based on the subset of selected nodes.

At each iteration, for each node $v_i \in V$, the system assigns an indicator variable $x_i$, such that:

$$x_i = \begin{cases} 1, & \text{if a sensor is placed at node } v_i, \\ 0, & \text{otherwise} \end{cases}$$

Also, at each iteration and for each node $v_j \in V$, the system assigns an indicator variable $y_j$, such that:

$$y_j = \begin{cases} 1, & \text{if a } v_j \text{ ends up having a unique signature,} \\ 0, & \text{otherwise} \end{cases}$$

At each iteration, the system can evaluate the subset of selected nodes using an objective function subject to a plurality of constraints to arrive at an "optimal" subset of selected nodes for sensor placement. In this implementation, the objective function and constraints applied by the system can be defined in terms of the indicator variables $x_i$ and $y_i$ whose values are previously assigned to each respective node of the plurality of nodes of the graph based on the subset of selected nodes for the given iteration.

Objective Function: Maximize $\Sigma_{v_j \in V} y_j$

Budget Constraint: $\Sigma_{v_j \in V} x_i \le B$,

In addition to the Budget Constraint, the system considers two additional constraints, Coverage Constraint (shown in FIG. 2B) and Unique Coverage Constraint (shown in FIG. 2C). Before introducing these constraints, this section clarifies what the terms Coverage and Unique Coverage mean in this context.

Definition 4.9. Coverage of a node $v_i$ can be defined as a Closed Neighborhood Set of node $v_i$, and is denoted by $Cov(v_i)$ $\{v_i \cup N^+(v)\}$.

Definition 4.10. Unique Coverage of a node pair $(v_i, v_j)$ can be defined as an Exclusive-OR of the Closed Neighborhood Set of the nodes $v_i$ and $v_j$ and is denoted by $Uni\_Cov$ $(v_i, v_j) = N^+(v_i) \oplus N^+(v)$ Coverage and Unique Coverage constraints can be defined according to:

Coverage Constraint: $\forall v_j \in V$ $$M_1 \times (1 - y_j) + \sum_{v_i \in N^+(v_j)} x_i \ge 1$$

Unique Coverage Constraint: $\forall v_j, v_k \in V, v_j \ne v_k$ $$M_2 \times (2 - y_j - y_k) + \sum_{v_i \in \{N^+(v_j) \oplus N^+(v_k)\}} x_i \ge 1$$

Note that the objective function shown above ensures that the largest number of nodes in V receives a unique signature. The budget constraint ensures that not more than B nodes in V can be selected for sensor placement. The Coverage Constraint ensures that if node $v_i$ has a unique signature (i.e., $y_i = 1$), a sensor must be placed in at least one node in its closed neighborhood (as otherwise $v_i$ will not have any signature, let alone a unique signature). The Unique Coverage Constraint ensures that for every pair of nodes $(v_j, v_k)$ in V to have unique signatures associated with them, (i.e., $y_j = 1$ and $y_k = 1$), a sensor must have been placed in at least 11                                                      12 one node in the node set $N^+(v_j) \oplus N^+(v_k)$. This guarantees that $v_j$ and $v_k$ will not have identical signatures. The parameters $M_1$ and $M_2$ in the constraints are two large constants.

In other words, with reference to FIG. 2B, the coverage constraint for a selected node $v_i$ of the subset of selected nodes is satisfied with respect to a first node $v_j$ of the plurality of nodes when:

a. a first uniqueness indicator variable $y_j$ associated with the first node $v_j$ has a first value (e.g., $y_j=1$, so the first node $v_j$ has a unique signature) and the selected node $v_i$ is within a closed neighborhood of the first node $v_j$(e.g., $v_i \in N^+(v_j)$); or b. a first uniqueness indicator variable $y_j$ associated with the first node $v_j$ has a second value (e.g., $y_j=0$, where the first node $v_j$ would not have a unique signature).

If the first node $v_j$ has a unique signature (where $y_j=1$), and has no selected nodes (e.g., $v_i$) within its closed neighborhood, this is suboptimal as the closed neighborhood of the first node $v_j$ will not be monitored. So, point (a) of the above ensures that if the first node $v_j$ has a unique signature, then the optimal subset needs to include a selected node $v_i$ that covers the first node $v_j$ by being in its closed neighborhood $v_i \in N^+(v_j)$. Conversely, if the first node $v_j$ does NOT have a unique signature (where $y_j=0$) as in point (b) above, then there is no penalty for not placing a sensor within its closed neighborhood (e.g., the selected node $v_i$ does not need to cover the first node $v_j$ by being in its closed neighborhood $v_i \in N^+(v_j)$).

Likewise, with reference to FIG. 2C, the unique coverage constraint for a selected node $v_i$ of the subset of selected nodes being satisfied with respect to a node pair $(v_j, v_k)$ that includes a first node $v_j$ and a second node $v_k$ of the plurality of nodes when:

a. at least one of a first uniqueness indicator variable $y_j$ associated with the first node $v_j$ or a second uniqueness indicator variable $y_k$ associated with the second node $v_k$ has a first value (e.g., $y=1$ or $y_k=1$), and the selected node $v_i$ is within a distinguishing set of the first node $v_j$ and the second node $v_k$ (e.g., where $v_i \in \{N^+(v_j)(N^+(v_k)\}$); or b. a first uniqueness indicator variable $y_j$ associated with the first node $v_j$ and a second uniqueness indicator variable $y_k$ associated with the second node both $v_k$ have a second value (e.g., $y_j=0$ and $y_k=0$ where neither $v_j$ nor $v_k$ have unique signatures).

If either the first node $v_j$ or the second node $v_k$ have a unique signature (where $y_j=1$ or $y_k=1$), but no selected nodes (e.g., $v_i$) are included within the distinguishing set between the first node $v_j$ and the second node $v_k$, this is suboptimal as there will be no way to distinguish which of the first node $v_j$ or the second node $v_k$ a potential anomaly would be associated with, as the distinguishing set $\{N^+(v_j) \oplus N^+(v_k)\}$ will not be monitored. So, point (a) of the above ensures that if the first node $v_j$ or the second node $v_k$ has a unique signature, then the optimal subset needs to include a selected node $v_i$ that covers either first node $v_j$ or the second node $v_k$ by being in their distinguishing set $\{N^+(v_j) \oplus N^+(v_k)\}$. Conversely, if neither the first node $v_j$ nor the second node $v_k$ have a unique signature (where $y_j=0$ and $y_k=0$) as in point (b) above, then there is no penalty for not placing a sensor within their distinguishing set (e.g., the selected node $v_i$ does not need to cover the distinguishing set between the first node $v_j$ or the second node $v_k$).

The system can iteratively select and evaluate the subset of selected nodes until an optimal subset of selected nodes is found that best satisfies the conditions outlined by the objective function and constraints shown above. Once the optimal subset of selected nodes has been found, sensors can be deployed at each selected node of the optimal subset of selected nodes for monitoring the network.

5. Experimental Results

Datasets used for validation of one implementation of the system were obtained from the Kentucky Water Resources Research Institute. Each dataset included information regarding the collection of pipes, pumps, valves, junctions, tanks, and reservoirs that make up a water distribution system (e.g., represented by the system as a graph). For this validation study, points of interest were considered to be nodes of the graph which represent junctions, tanks, and reservoirs of the water distribution system, whereas the edges of the graph represent pipes, pumps, and valves.

The results of one validation study on the datasets are presented in Table 6. For the ease of understanding, this section of the disclosure will describe in detail the result for the first row, i.e., the Fourteen Pipes dataset. The Fourteen Pipes dataset has 12 nodes and 26 edges. The third column denotes the MICS cardinality for this graph. The rationale for computing the MICS for the datasets was to ensure variation of the budget parameter according to the MICS cardinality. In one setup, three different budget parameters are considered, k=25%, 50% and 75% of the MICS cardinality. For instance, in the Fourteen Pipes dataset, the MICS solution is 8 and the budget parameters are k=25% of 8=2, k=50% of 8=4 and k=75% of 8=6. The task undertaken during the validation study was to identify the locations for sensor placement which maximize the number of nodes which would be uniquely covered (i.e., will have a unique fault signature). For the Fourteen Pipes dataset, with at most 2 sensors (k=25%), the optimal number of nodes uniquely covered is 3, for which the coverage % (% of nodes uniquely covered with the budget) is $$\frac{3}{12} = 25\%,$$

where 12 is the number of nodes in the network. Similarly, for k=50% or when the budget is 4, 7 nodes can be uniquely covered optimally, with 58.33% coverage, and finally for k=75%, 10 nodes can be uniquely covered optimally, with 83.33% coverage. Similar results for the other datasets follow. Note that, for all the datasets considered, the coverage %≥k. In other words, the benefits, in terms of the number of nodes uniquely covered, outweigh the cost (budget). The average benefits for the costs k=25%, 50%, 75% are 30.96%, 58.04% and 82.42%.

Figure 3:
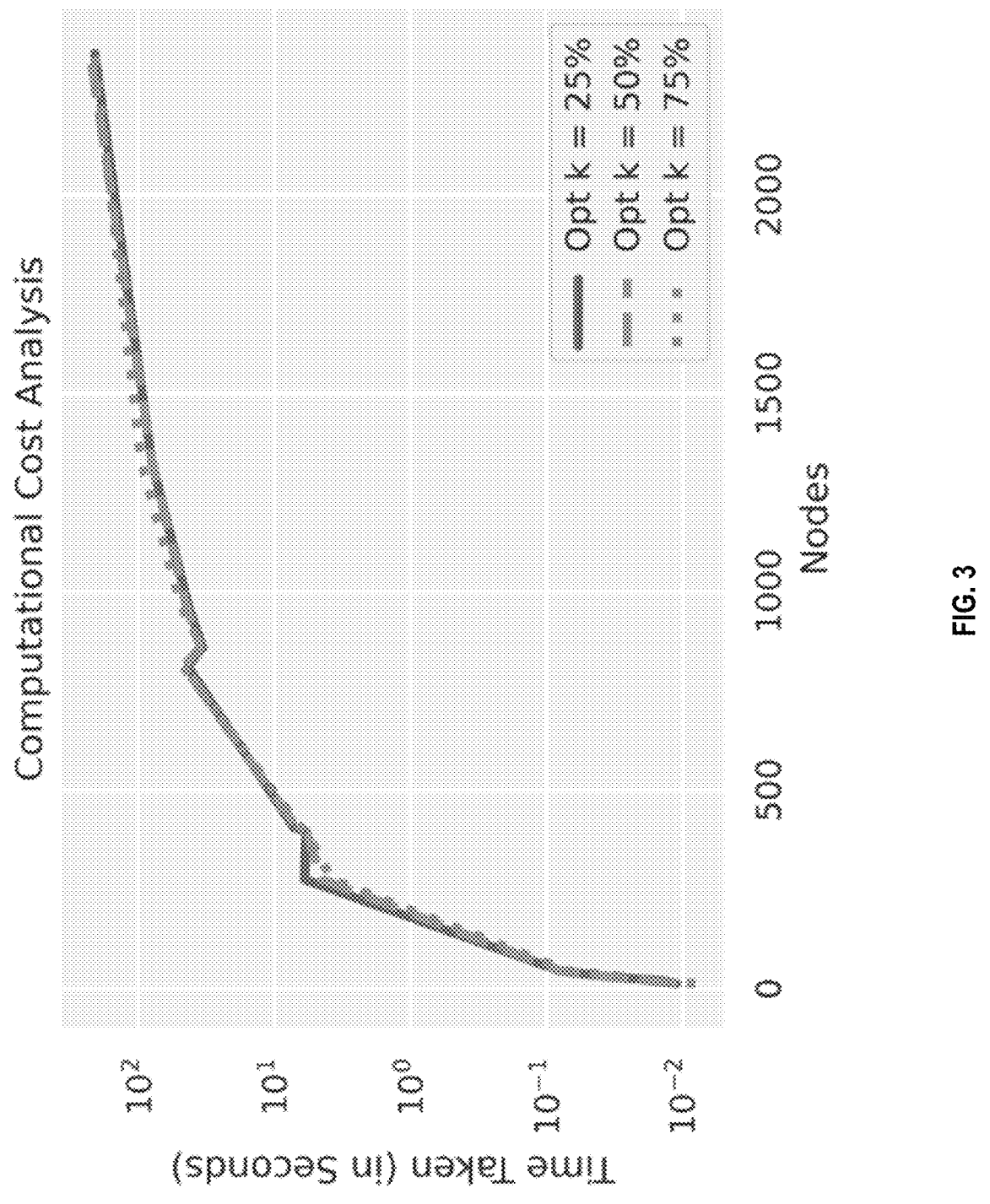
FIG. 3 is a graphical representation showing a computational cost analysis for one implementation of the framework of FIGS. 2A-2C.

FIG. 3 illustrates the time taken by the optimal approach. Note that the optimal solution computes the solution for the largest graph considered fairly quickly, i.e., in a couple of minutes.

TABLE 6

| | Num | Num | MICS | k = 25% | | k = 55% | | k = 75% | |
|---|---|---|---|---|---|---|---|---|---|
| Dataset | Nodes | Edges | Solution | OPT | Cov. % | OPT | Cov. % | OPT | Cov. % |
| Fourteen Pipes | 12 | 26 | 8 | 3 | 25% | 7 | 58.33% | 10 | 83.33% |
| Modified 19 Pipe | 14 | 35 | 9 | 6 | 42.85% | 9 | 64.28% | 12 | 85.71% |
| Hanoi | 32 | 66 | 21 | 10 | 31.25% | 18 | 56.25% | 25 | 78.12% |
| FOWM | 45 | 94 | 30 | 14 | 31.11% | 25 | 55.55% | 37 | 82.22% |
| Kentucky 3 | 275 | 646 | 161 | 83 | 30.18% | 160 | 58.18% | 227 | 82.54% |
| Calibration | 396 | 840 | 257 | 119 | 30.05% | 228 | 57.57% | 327 | 82.57% |
| Long Term | 407 | 866 | 263 | 121 | 29.73% | 234 | 57.49% | 336 | 82.55% |
| Kentucky 2 | 812 | 1927 | 485 | 250 | 30.78% | 476 | 58.62% | 672 | 82.75% |
| Kentucky 1 | 859 | 1844 | 548 | 257 | 29.91% | 496 | 57.74% | 710 | 82.65% |
| Kentucky 4 | 962 | 2103 | 619 | 294 | 30.56% | 561 | 58.31% | 795 | 82.64% |
| Kentucky 8 | 1329 | 2936 | 826 | 412 | 31% | 786 | 59.14% | 1113 | 83.74% |
| Kentucky 12 | 2355 | 4810 | 1583 | 686 | 29.12% | 1296 | 55.03% | 1890 | 80.25% |

6. Summary

The present disclosure outlines a budget-constrained version of the Identifying Code problem, geared towards identifying sources of anomalies in water distribution systems of smart cities. An optimal solution for the problem is demonstrated through ILP, along with a proof that no approximate algorithm for the MSGC with $1/k$ factor bound ($k \geq 1$) can exist, unless P=NP. Conventionally, ILPs tend to be computationally expensive, however, in experimentation, computation times are found to be fairly small, even for graphs with more than 2300 nodes and 4800 edges. In one implementation, it took less than a couple of minutes using GUROBI on an Intel i-9 processor with 128 GB RAM.

7. Computer-Implemented System

7.1 Computing Device

Figure 4:
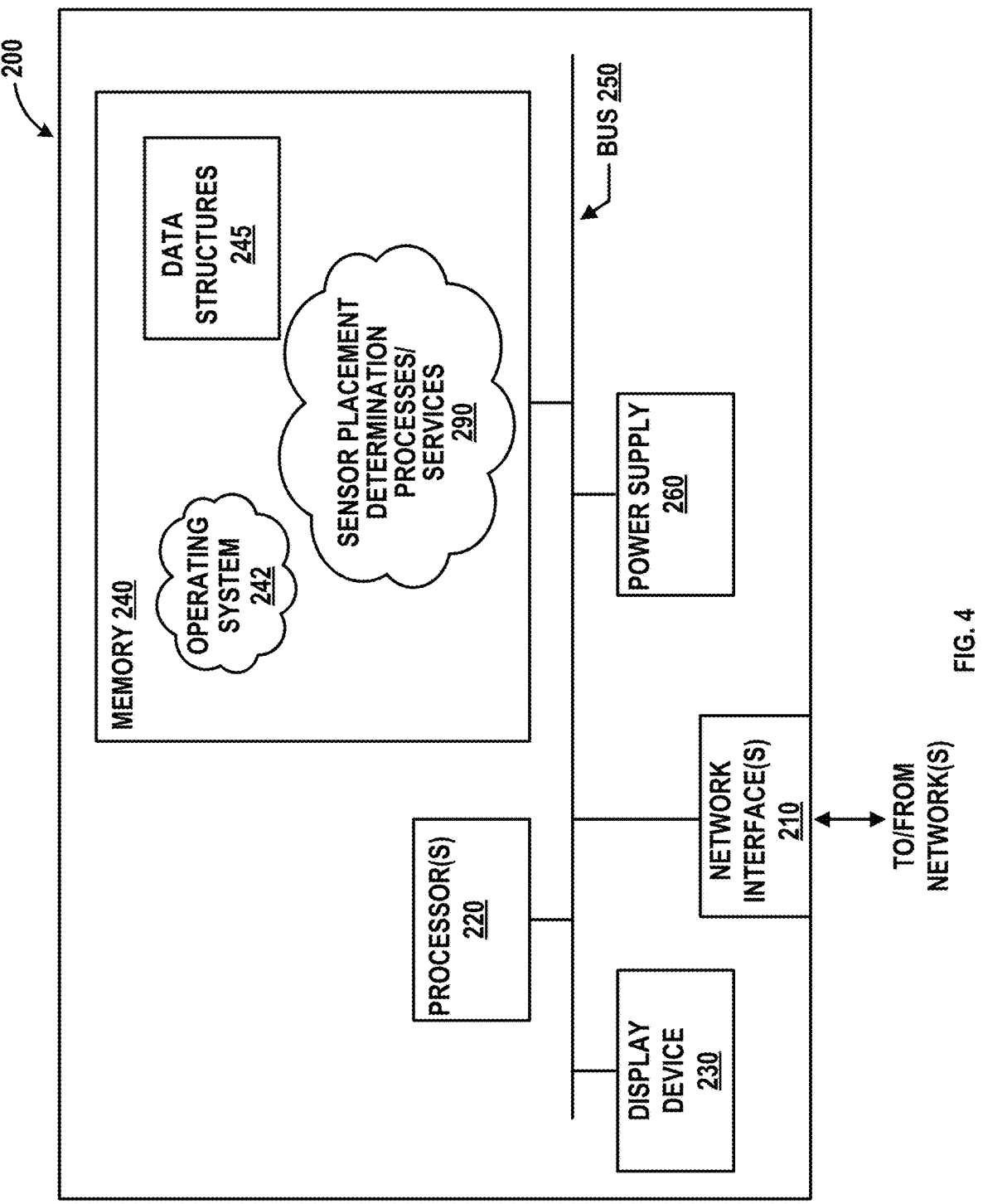
FIG. 4 is a simplified diagram showing an example computing device for implementation of the framework of FIGS. 2A-2C.

FIG. 4 is a schematic block diagram of an example device 200 that may be used with one or more embodiments described herein, e.g., as a component of the system disclosed herein implementing the functionalities discussed above and shown in FIGS. 2A-2C as well as FIGS. 5A and 5B discussed further herein.

Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.). Device 200 can also include or otherwise communicate with a display device 230 for displaying the results of the methods, e.g., for indicating the optimal subset of selected nodes having a cardinality value that is less than or equal to the budget value, that maximizes a sum of uniqueness indicator variables for each node of the plurality of nodes of the graph, and that jointly satisfies the coverage constraint and the unique coverage constraint with respect to each node of the plurality of nodes.

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches). Memory 240 can include instructions executable by the processor 220 that, when executed by the processor 220, cause the processor 220 to implement aspects of the system and the methods outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include sensor placement determination processes/services 290, which can include aspects of the method and/or implementations of various modules described herein. Note that while sensor placement determination processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the sensor placement determination processes/services 290 is shown as a standalone process, those skilled in the art will appreciate that this process may be executed as a routine or module within other processes.

7.2 Computer-Implemented Method

FIGS. 5A and 5B show a method 300 for budget-constrained sensor placement determination as outlined herein. Method 300 corresponds with the framework 100 shown in FIG. 2A, the constraint evaluations shown in FIGS. 2B and 2C, and the sensor placement determination processes/services 290 that can be implemented by computing device 200 shown in FIG. 4.

Referring to FIG. 5A, step 302 of method 300 includes accessing a graph defining a plurality of nodes and a plurality of edges, each respective edge of the plurality of edges connecting two or more nodes of the plurality of nodes. Step 304 of method 300 includes accessing a budget value representing a quantity of nodes to be selected for sensor placement.

Step 306 of method 300 includes identifying a closed neighborhood of a node of the plurality of nodes, the closed neighborhood including a union between a first set that includes the node and a second set that includes any other nodes of the plurality of nodes that are adjacent to the node on the graph. Step 306 may be repeated as necessary for each node of the plurality of nodes. In some examples, step 306 may be applied as needed before or after selection of a subset of nodes for evaluation (see step 312 of FIG. 5B). Step 308 of method 300 includes identifying a distinguishing set of a node pair that includes a first node and a second node of the plurality of nodes, the distinguishing set being resultant of an exclusive-or operation between a closed neighborhood of the first node and a closed neighborhood of the second node. Similarly, step 308 may be repeated as necessary for each node of the plurality of nodes. In some examples, step 308 may be applied as needed before or after selection of a subset of nodes for evaluation (see step 312 of FIG. 5B).

Steps 310A and 310B are applied for evaluating a uniqueness of a given node of the plurality of nodes. Similarly, step 310A or step 310B may be repeated as necessary for each node of the plurality of nodes, and in some examples, may be applied as needed before or after selection of a subset of nodes for evaluation (see step 312 of FIG. 5B). Step 310A of method 300 includes assigning a first value to a uniqueness indicator variable of a node of the plurality of nodes, the node having a closed neighborhood that is different than respective closed neighborhoods of all other nodes of the plurality of nodes. Step 310B of method 300 includes assigning a second value to a uniqueness indicator variable of a first node of the plurality of nodes, the first node having a closed neighborhood that is identical to a closed neighborhood of any other node of the plurality of nodes.

Referring to FIG. 5B, step 312 of method 300 includes selecting a subset of nodes from the plurality of nodes, a cardinality value of the subset of nodes correlating with the budget value.

Step 314 of method 300 includes evaluating, for each selected node of the subset of selected nodes, a coverage constraint (see FIG. 2B) with respect to the plurality of nodes of the graph. The coverage constraint for a selected node of the subset of selected nodes can be satisfied with respect to a first node of the plurality of nodes when a first uniqueness indicator variable associated with the first node has a first value and the selected node is within a closed neighborhood of the first node. Alternatively, the coverage constraint for a selected node of the subset of selected nodes can be satisfied with respect to a first node of the plurality of nodes when a first uniqueness indicator variable associated with the first node has a second value.

Step 316 of method 300 includes evaluating, for each selected node of the subset of selected nodes, a unique coverage constraint (see FIG. 2C) with respect to the plurality of nodes of the graph. The unique coverage constraint for a selected node of the subset of selected nodes can be satisfied with respect to a node pair that includes a first node and a second node of the plurality of nodes when at least one of a first uniqueness indicator variable associated with the first node or a second uniqueness indicator variable associated with the second node has a first value, and the selected node is within a distinguishing set of the first node and the second node. Alternatively, the unique coverage constraint for a selected node of the subset of selected nodes can be satisfied with respect to a node pair that includes a first node and a second node of the plurality of nodes when a first uniqueness indicator variable associated with the first node and a second uniqueness indicator variable associated with the second node both have a second value.

Step 318 can include evaluating, for the subset of selected nodes, a sum of uniqueness indicator variables for each node of the plurality of nodes of the graph.

Steps 312-318 can be iteratively repeated for multiple subsets to explore different options for sensor placement. Step 320 includes identifying an optimal subset of selected nodes having a cardinality value that is less than or equal to the budget value, that maximizes a sum of uniqueness indicator variables for each node of the plurality of nodes of the graph, and that jointly satisfies the coverage constraint and the unique coverage constraint with respect to each node of the plurality of nodes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
   a processor in communication with a memory, the memory including instructions executable by the processor to:
   generate, in the memory, data structures representing:
   (i) for each node of a plurality of nodes of a graph representing a network, a closed neighborhood of the node, and
   (ii) for each respective pair of distinct nodes of the plurality of nodes including a first node and a second node, a distinguishing set for the pair that is equal to a symmetric difference of a first closed neighborhood of the first node and a second closed neighborhood of the second node;
   instantiate, for each node in the plurality of nodes:
   (i) a binary placement variable that represents selection of the node for sensor placement, and
   (ii) a binary uniqueness variable that represents whether the node is uniquely identifiable relative to other nodes given a set of selected sensors;
   construct, in the memory, a coefficient matrix for a binary integer linear program, the coefficient matrix including:
   (i) a coverage constraint for each respective node of the plurality of nodes that references binary placement variables for nodes included in the closed neighborhood of the node, and assigns coefficient zero to binary placement variables for nodes not included in that closed neighborhood, (ii) a unique-coverage constraint for each respective pair of distinct nodes of the plurality of nodes that references binary placement variables for nodes included in a distinguishing set for that pair, and assigns coefficient zero to binary placement variables for nodes not included in the distinguishing set for that pair, and (iii) a budget constraint that limits a quantity of nodes selected for sensor placement to a budget value;

execute, by the processor, an integer linear programming solver using the coefficient matrix to compute values of the binary placement variables and the binary uniqueness variables that:

(i) maximize a sum of binary uniqueness variables for each node of the plurality of nodes of the graph, and (ii) that jointly satisfies the coverage constraint, the unique-coverage constraint, and the budget constraint with respect to each node of the plurality of nodes; and output, by the processor, a deployment configuration for sensor placement at an optimal subset of nodes for which the binary placement variables indicate selection.

2. The system of claim 1, the coverage constraint for a selected node of the optimal subset of nodes being satisfied with respect to the first node of the plurality of nodes when a first binary uniqueness variable associated with the first node has a first value and the selected node is within a closed neighborhood of the node.

3. The system of claim 1, the coverage constraint for a selected node of the optimal subset of nodes being satisfied with respect to the first node of the plurality of nodes when a first binary uniqueness variable associated with the first node has a second value.

4. The system of claim 1, the unique-coverage constraint for a selected node of the optimal subset of nodes being satisfied with respect to the first node and the second node of the node pair when at least one of a first binary uniqueness variable associated with the first node or a second binary uniqueness variable associated with the second node has a first value, and the selected node is within a distinguishing set of the first node and the second node.

5. The system of claim 1, the unique-coverage constraint for a selected node of the optimal subset of nodes being satisfied with respect to the first node and the second node of the pair when a first binary uniqueness variable associated with the first node and a second binary uniqueness variable associated with the second node both have a second value.

6. The system of claim 1, the memory further including instructions executable by the processor to:

identify the closed neighborhood of the node of the plurality of nodes, the closed neighborhood including a union between a first set that includes the node and a second set that includes any other nodes of the plurality of nodes that are adjacent to the node on the graph.

7. The system of claim 1, the memory further including instructions executable by the processor to:

assign a first value to a binary uniqueness variable of a node of the plurality of nodes, the node having a closed neighborhood that is different than respective closed neighborhoods of all other nodes of the plurality of nodes.

8. The system of claim 1, the memory further including instructions executable by the processor to:

assign a second value to a binary uniqueness variable of a node of the plurality of nodes, the first node having a closed neighborhood that is identical to a closed neighborhood of any other node of the plurality of nodes.

9. The system of claim 1, the graph being representative of a water distribution network.

10. The system of claim 9, the plurality of nodes of the graph representing points of interest including one or more junctions, one or more tanks, and/or one or more reservoirs of the water distribution network.

11. The system of claim 9, a plurality of edges of the graph representing connecting elements between two or more nodes of the graph including one or more pipes, one or more pumps, and/or one or more valves of the water distribution network.

12. The system of claim 9, the optimal subset of nodes of the graph being identified for sensor placement.

13. A method, comprising:

accessing, by a processor, a graph representing a network and defining a plurality of nodes and a plurality of edges, each edge connecting two or more nodes;

generating, at a memory in communication with the processor, data structures representing:

(i) for each node of the plurality of nodes, a closed neighborhood of the node, and (ii) for each pair of distinct nodes of the plurality of nodes including a first node and a second node, a distinguishing set for the pair that is equal to a symmetric difference of a first closed neighborhood of the first node and a second closed neighborhood of the second node;

instantiating, for each node of the plurality of nodes, a binary placement variable that represents selection of the node for sensor placement and a binary uniqueness variable that represents whether the node is uniquely identifiable relative to other nodes given a set of selected sensors;

constructing, in the memory, a binary integer linear programming model that includes:

(i) coverage constraints for each node of the plurality of nodes based on the closed neighborhood of the node, (ii) unique-coverage constraints for each pair of distinct nodes of the plurality of nodes based on the distinguishing set for the pair, and (iii) a budget constraint that limits a number of nodes selected for sensor placement, as indicated by the binary placement variables, to a budget value;

solving, by the processor executing an integer linear programming solver, the binary integer linear programming model to obtain values of the binary placement variables and the binary uniqueness variables that maximize a sum of the binary uniqueness variables subject to the coverage constraints, the unique-coverage constraints, and the budget constraint; and outputting, by the processor, a deployment configuration for sensor placement at an optimal subset of nodes for which the binary placement variables indicate selection.

14. The method of claim 13, the coverage constraint for a selected node of the optimal subset of nodes being satisfied with respect to the first node when:

a first binary uniqueness variable associated with the first node has a first value and the selected node is within a closed neighborhood of the first node; or a first binary uniqueness variable associated with the first node has a second value.

15. The method of claim 13, the unique-coverage constraint for a selected node of the optimal subset of nodes being satisfied with respect to the first node and the second node of the pair when:

at least one of a first binary uniqueness variable associated with the first node or a second binary uniqueness variable associated with the second node has a first value, and the selected node is within a distinguishing set of the first node and the second node; or the first binary uniqueness variable associated with the first node and the second uniqueness indicator variable associated with the second node both have a second value.

16. The method of claim 13, further comprising:

identifying the closed neighborhood of the node of the plurality of nodes, the closed neighborhood including a union between a first set that includes the node and a second set that includes any other nodes of the plurality of nodes that are adjacent to the node on the graph.

17. The method of claim 13, further comprising:

assign a first value to a binary uniqueness variable of a node of the plurality of nodes, the node having a closed neighborhood that is different than respective closed neighborhoods of all other nodes of the plurality of nodes.

18. The method of claim 13, further comprising:

assign a second value to a binary uniqueness variable of a first node of the plurality of nodes, the first node having a closed neighborhood that is identical to a closed neighborhood of any other node of the plurality of nodes.

\*     \*     \*     \*     \*